United States Patent [19]

Garner et al.

[11] 4,203,875
[45] May 20, 1980

[54] HIGH SOLIDS URETHANES AND APPLICATION THEREOF

[75] Inventors: James W. Garner, Farmington Hills; Robert G. Kelso, Southfield, both of Mich.

[73] Assignee: Grow Chemical Corp., New York, N.Y.

[21] Appl. No.: 799,179

[22] Filed: May 23, 1977

Related U.S. Application Data

[62] Division of Ser. No. 599,833, Jul. 28, 1975, Pat. No. 4,070,509.

[51] Int. Cl.$^2$ .................. C08L 75/06; C08G 18/42
[52] U.S. Cl. .................................. 260/13; 260/37 N; 528/58; 528/75; 528/80
[58] Field of Search ........ 260/13, 77.5 AN, 77.5 AM, 260/77.5 CR, 859; 528/75, 80, 58

[56] References Cited

U.S. PATENT DOCUMENTS

| | | | |
|---|---|---|---|
| 2,912,414 | 11/1959 | Schulteis | 260/75 |
| 2,929,800 | 3/1960 | Hill | 260/77.5 |
| 2,933,477 | 4/1960 | Hostettler | 260/77.5 |
| 2,965,615 | 12/1960 | Tess | 260/77.5 |
| 3,248,373 | 4/1966 | Barringer | 260/77.5 |
| 3,267,058 | 8/1966 | Hixenbaugh | 260/23 |
| 3,440,086 | 4/1969 | Kerns | 117/105.5 |
| 3,506,620 | 4/1970 | Davis | 260/75 |
| 3,523,103 | 8/1970 | Zemlin | 260/75 |
| 3,557,249 | 1/1971 | Dannels et al. | 260/858 |
| 3,591,561 | 7/1971 | Kazama et al. | 260/77.5 |
| 3,635,906 | 1/1972 | Jayawant | 260/77.5 AC |
| 3,654,347 | 4/1972 | Kincaid et al. | 260/484 R |
| 3,660,357 | 5/1972 | Kolychek | 260/77.5 AN |
| 3,691,135 | 9/1972 | Schulze | 260/77.5 AP |
| 3,719,638 | 3/1973 | Huemmer et al. | 260/77.5 CR |
| 3,726,827 | 4/1973 | Jones et al. | 260/31.8 N |
| 3,741,918 | 6/1973 | Koleske et al. | 260/2.5 AY |
| 3,761,439 | 9/1973 | Ward et al. | 260/32.8 N |
| 3,821,056 | 6/1974 | Reardon | 260/77.5 AN |
| 3,843,708 | 10/1974 | Matzner | 260/463 |
| 3,892,714 | 7/1975 | Sampson | 260/77.5 CR |
| 3,919,174 | 11/1975 | Taller | 260/77.5 AB |
| 3,931,113 | 1/1976 | Seeger et al. | 260/75 T |
| 3,969,569 | 7/1976 | Vasta | 428/332 |
| 4,051,111 | 9/1977 | Holloway | 260/75 NP |
| 4,098,747 | 7/1978 | Bailey et al. | 260/30.4 N |

FOREIGN PATENT DOCUMENTS

35/15798 10/1960 Japan.
1402658 8/1975 United Kingdom.
1402659 8/1975 United Kingdom.

*Primary Examiner*—Earl A. Nielsen
*Attorney, Agent, or Firm*—Burton, Parker and Schramm

[57] ABSTRACT

A method for applying a polyurethane coating onto a substrate by employing a catalyzed coating composition comprising the steps:

(1) Providing a coating composition comprised of:
  (A) a polyol composition comprising (1) a polymerized low molecular weight polyol selected from the group consisting of (a) polycaprolactone; (b) a copolymer of a compound of the formula $CH_2=C(R)-R^1$ and allyl alcohol; and (c) mixtures thereof; (2) a saturated aliphatic polyol from 4 to 12 carbon atoms or a saturated cycloaliphatic polyol of from 5 to 8 carbon atoms per ring; wherein R is methyl, ethyl or hydrogen; $R^1$ is a group having 6 to 12 carbon atoms containing an aromatic carbocyclic ring;
  (B) a polyisocyanate; wherein the ratio of NCO/OH of A and B ranges from about 0.9 to 1.2; the coating composition having a range of solids content from about 40 to about 100% by weight; and
  (C) a compatible polyurethane catalyst;
(2) Applying the coating composition to a substrate; and
(3) Heating the coated substrate at a temperature-time range of from about 130° F. to about 180° F. for a period of time ranging from about 15 minutes to about 60 minutes to achieve a Tukon hardness of at least 3 within 24 hours.

14 Claims, No Drawings

HIGH SOLIDS URETHANES AND APPLICATION THEREOF

This is a division of application Ser. No. 599,833, filed July 28, 1975, now U.S. Pat. No. 4,070,509, issued Jan. 24, 1978.

BACKGROUND OF THE INVENTION

The present invention is related to the use of high solids urethanes which are useful as coating compositions for desirable substrates. The advantages of employing coating compositions that have a high solids content are multi-purpose. The first purpose is to decrease the organic solvent content that is present in the coating compositions. This is to decrease the amount of organic solvent that is emitted during the curing cycle of the coating composition. Additionally, however, the use of a high solids coating composition is particularly desirable if equivalent coatings can be obtained employing substantially less energy to obtain the final coating.

As background to the present application, one may review the following references:

U.S. Pat. No. 3,440,086 relates to a multi-component composition that is pre-mixed to give a sprayed deposit on a substrate employing polyurethane coatings. U.S. Pat. No. 3,557,249 relates to thermo-setting allyl compositions. U.S. Pat. No. 3,691,135 relates to fast drying polyurethane coatings made from an isocyanate, a polyhydric alcohol and a polyol which is a condensation product of glyoxal and a polyhydric alcohol. U.S. Pat. No. 3,719,638 relates to radiation curable acrylic urethane monomers. A styrene and allyl alcohol copylmer is a component of the curable composition. U.S. Pat. No. 3,726,827 relates to a rapid setting urethane composition which is an isocyanate terminated product. U.S. Pat. No. 3,741,918 relates to the manufacture of poly(oxocaproyl) polyurethane products. U.S. Pat. No. 3,786,081 relates to polyoxy alkylated derivatives of carbamic acids for use as quick drying cold demulsifiers for water and oil emulsions. U.S. Pat. No. 3,843,708 relates to extended polylactone diol compositions. Styrene, allyl alcohol copolymers as a component in urethane coatings are discussed in *Paint and Varnish Production*, July 1963. Urethane coatings are also described in *Federation Series on Coatings Technology*, Unit 15 (July, 1970).

SUMMARY OF THE INVENTION

A method for applying a polyurethane coating onto a substrate by employing a catalyzed coating composition comprising the steps:
(1) Providing a coating composition comprised of:
  (A) a polyol composition comprising (1) a polymerized low molecular weight polyol selected from the group consisting of (a) polycaprolactone; (b) a copolymer of a compound of the formula $CH_2=C(R)-R^1$ and allyl alcohol; and (c) mixtures thereof; (2) a saturated aliphatic polyol from 4 to 12 carbon atoms or a saturated cycloaliphatic polyol of from 5 to 8 carbon atoms per ring; wherein R is methyl, ethyl or hydrogen; $R^1$ is a group having 6 to 12 carbon atoms containing an aromatic carbocyclic ring;
  (B) A polyisocyanate; wherein the ratio of NCO/OH of A and B ranges from about 0.9 to 1.2; the coating composition having a range of solids content from about 40 to about 100% by weight; and
  (C) a compatible polyurethane catalyst;
(2) Applying the coating composition to a substrate; and
(3) Heating the coated substrate at a temperature-time range of from about 130° F. to about 180° F. for a period of time ranging from about 15 minutes to about 60 minutes to achieve a Tukon hardness of at least 3 within 24 hours.

In a preferred embodiment, the desired hardness is achieved within a very short time after heating, such as 3 hours or less.

DESCRIPTION OF PREFERRED EMBODIMENTS

The coating compositions useful in the present invention should be those that give a resultant film that is protective and preferably decorative as well, such as a top coat for the automotive industry. By protective is meant that the coating is characterized by hardness, toughness, solvent and scratch resistance, durable and not brittle. Most preferably the coating composition should be sprayable.

The resinous polyol should have a low molecular weight (by weight) i.e. up to about 5,000 preferably about 1,000 to about 3,000.

In trying to obtain a film former which has the ability to have a high solids content and therefore a low volatile organic solvent content and yet achieve sufficient hardness under a desirable cure cycle, a limited number of film formers are available. The first preferred film former is one that is a resinous polyol of a low molecular weight hydroxy containing polycaprolactone supplied under the trademark NIAX (trademark of Union Carbide) and is available as PCP 600. The molecular weight range preferably is from about 1,000 to 3,000 on a weight basis and is normally a hydroxy containing thermo-plastic material.

The second preferred polyol is a copolymer of allyl alcohol and a compound of the formula $CH_2=C(R)-R^1$; wherein $R^1$ is a group having 6 to 12 carbon atoms containing an aromatic carbocyclic ring. The group $CH_2=C(R)-R^1$ is preferably styrene or its alkylated derivatives thereof, such as vinyl toluene; 3,5-dimethyl styrene; 4-tert-butyl styrene; alpha methyl styrene, and the like. A preferred copolymer is that containing styrene. The latter copolymer is commercially available under the mark RJ-100 or 101 (trademark of Monsanto Company) for styrene-allyl alcohol copolymers having molecular weight on a weight basis of about 1,700 to about 2,400. The number of moles of styrene per mole of allyl alcohol ranges from about 12 to 18 while the number moles of hydroxyl group per mole of copolymer is about 8, preferably 7.8.

The polyol composition also contains other reactive polyols such as saturated aliphatic polyols of from 4 to 12 carbon atoms or saturated cycloaliphatic polyols having from 5 to 8 carbon atoms per ring. Useful examples of such polyols are alkylene glycol as butylene glycol, hexylene glycol, octylene glycol, decylene glycol, 2-ethyl hexane diol, cyclohexane glycol, 1,4-cyclohexane dimethanol, neopentyl glycol, as well as triols as trimethylolpropane, trimethylolethane, and other polyols such as pentaerythritol, carbohydrates such as those having 5 to 7 carbon atoms as sorbitol and the like.

The aliphatic polyols are added as reactive diluents in order to give desired viscosity such as needed for spraying composition and increase solids content.

The amount of polymerized low molecular weight polyol that may be employed is preferably from about 25% to about 50% by weight of the total polyol composition (Component A).

The aliphatic polyol that is employed comprises the remainder of the polyol composition.

Additional components of the polyol composition that may also be employed, preferably in an amount of about 25 to 50% by weight of the polyol composition are polyhydric hydantoin materials. These materials are generally of the structure

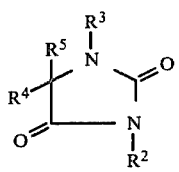

wherein $R^4$ and $R^5$ may be the same or different and may be hydrogen, alkyl of 1 to 6 carbon atoms, hydroxyl alkyl of 1 to 6 carbon atoms, phenyl and the like;

$R^2$ and $R^3$ may be the same or different and may be hydrogen, alkyl of from 1 to 6 carbon atoms, hydroxyalkyl of from 1 to 6 carbon atoms, polyoxyalkylene of from 2 to 4 carbon atoms per alkylene group with a terminal hydroxy group; groups as —[CH$_2$CH$_2$—O]$_n$—H —[CH$_2$—CH(CH$_2$OH)O]$_n$—H where n ranges from 1 to 10, and the like. It is to be appreciated that the hydantoin materials must contain at least two hydroxyl groups. Normally these compounds are prepared by reacting dimethyl hydantoin ($R^4$ and $R^5$ are methyl and $R^2$ and $R^3$ are hydrogen) with the appropriate hydroxy inducing material, such as, epichlorohydrin, ethylene oxide, propylene oxide, butylene oxide and the like. The reaction product of epichlorohydrin may require hydrolysis to remove the chloro groups. In general, "polyhydric hydantoin" derivatives may be said to contain the basic five membered ring structure recited above (regardless of $R^{2-5}$ substituents) with at least two hydroxy groups in the molecule.

It has also been determined that bis hydantoin derivatives may also be employed, i.e., the appropriate hydroxy derivative of methylene-bis-(substituted hydantoin).

The preferred hydantoin is where $R^4$ and $R^5$ are both methyl and $R^2$ and $R^3$ are both —C$_2$H$_4$OH. A second preferred hydantoin is when $R^4$ and $R^5$ are both methyl and $R^2$ and $R^3$ are both —CH$_2$OH. Another hydantoin may be where $R^2$ and $R^3$ are both —C$_3$H$_6$OH.

It has been found highly desirable to employ the hydantoin materials because an increased stability, in terms of resistance to degredation is obtained.

It has also been found desirable optionally to add cellulose acetate butyrate or nitro cellulose (urethane grade) or equivalent substances from about 1 to 60%, preferably 5 to 25% of the polyol composition. When large amounts of CAB are used, the solids content of the coating composition therefore decreases.

With respect to the polyisocyanate that may be employed in the present invention, listed below are useful polyisocyanates:
propylene-1,2-diisocyanate;
butylene-1,2-diisocyanate;
butylene-1,3-diisocyanate;
hexamethylene diisocyanate;
octamethylene diisocyanate;
nonamethylene diisocyanate;
decamethylene diisocyanate;
2,11-diisocyanato-dodecane and the like;
meta-phenylene diisocyanate;
para-phenylene diisocyanate;
toluene-2,4-diisocyanate;
toluene-2,6-diisocyanate;
xylene-2,6-diisocyanate;
xylene-2,6-diisocyanate;
dialkyl benzene diisocyanates, such as methylpropylbenzene diisocyanate, methylethylbenzene diisocyanate and the like;
2,2'-biphenylene diisocyanate;
3,3'-biphenylene diisocyanate;
4,4'-biphenylene diisocyanate;
3,3'-dimethyl-4,4'-biphenylene diisocyanate, and the like;
methylene-bis-(4-phenyl isocyanate);
ethylene-bis-(4-phenyl isocyanate);
isopropylidene-bis-(4-phenyl isocyanate);
butylene-bis-(4-phenyl isocyanate);
hexafluoroisopropylidene-bis-(4-phenyl isocyanate), and the like;
2,2'-oxydiphenyl diisocyanate;
3,3'-oxydiphenyl diisocyanate;
4,4'-oxydiphenyl diisocyanate, and the like;
2,2'-ketodiphenyl diisocyanate;
3,3'-ketodiphenyl diisocyanate;
4,4'-ketodiphenyl diisocyanate;
2,2'-thiodiphenyl diisocyanate;
3,3'-thiodiphenyl diisocyanate;
4,4'-thiodiphenyl diisocyanate, and the like;
2,2'-sulfonediphenyl diisocyanate;
3,3'-sulfonediphenyl diisocyanate;
4,4'-sulfonediphenyl diisocyanate, and the like;
2,2'-methylene-bis-(cyclohexyl isocyanate);
3,3'-methylene-bis-(cyclohexyl isocyanate);
4,4'-methylene-bis-(cyclohexyl isocyanate);
4,4'-ethylene-bis-(cyclohexyl isocyanate);
4,4'-propylene-bis-(cyclohexyl isocyanate);
bis-(para-isocyanato-cyclohexyl) sulfide;
bis-(para-isocyanato-cyclohexyl) sulfone;
bis-(para-isocyanato-cyclohexyl) ether;
bis-(para-isocyanato-cyclohexyl) diethyl silane;
bis-(para-isocyanato-cyclohexyl) diphenyl silane;
bis-(para-isocyanato-cyclohexyl) ethyl phosphine oxide;
bis-(para-isocyanato-cyclohexyl) phenyl phosphine oxide;
bis-(para-isocyanato-cyclohexyl) N-phenyl amine;
bis-(para-isocyanato-cyclohexyl) N-methyl amine;
2,6-diisocyanato-pyridine;
bis-(4-isocyanato-phenyl) diethyl silane;
bis-(4-isocyanato-phenyl) diphenyl silane;
dichloro-biphenylene diisocyanate, bis-(4-isocyanatophenyl) ethyl phosphine oxide;
bis-(4-isocyanato-phenyl) phenyl phosphine oxide;
bis-(4-isocyanato-phenyl) N-phenyl amine;
bis-(4-isocyanato-phenyl) N-methyl amine;
3,3'-dimethyl-4,4'-diisocyanato biphenyl;
3,3'-dimethoxy-biphenylene diisocyanate;
2,4-bis-(B-isocyanato-t-butyl) toluene;
bis-(para-B-isocyanato-t-butyl-phenyl) ether;
para-bis-(2-methyl-4-isocyanato-phenyl) benzene;
3,3'-diisocyanato adamantane;

3,3'-diisocyanato biadamantane;
3,3'-diisocyanatoethyl-1,1'-biadamantane;
1,2-bis-(3-isocyanato-propoxy) ethane;
2,2'dimethyl propylene diisocyanate;
3-methoxy-hexamethylene diisocyanate;
2,5-dimethyl heptamethylene diisocyanate;
5-methyl-nonamethylene diisocyanate;
1,4-diisocyanato-cyclohexane;
1,2-diisocyanato-octadecane;
2,5-diisocyanato-1,3,4-oxadiazole;
$OCN(CH_2)_3O(CH_2)_2O(CH_2)_3NCO$;
$OCN(CH_2)_3S(CH_2)_3NCO$;
$OCN(CH_2)_3N(CH_2)_3NCO$;
polymethylene polyphenyl isocyanate;
biurets of the formula

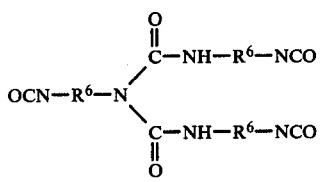

where $R^6$ is an alkylene group having 1-6 carbon atoms; especially preferred is the biuret of hexamethylene diisocyanate;

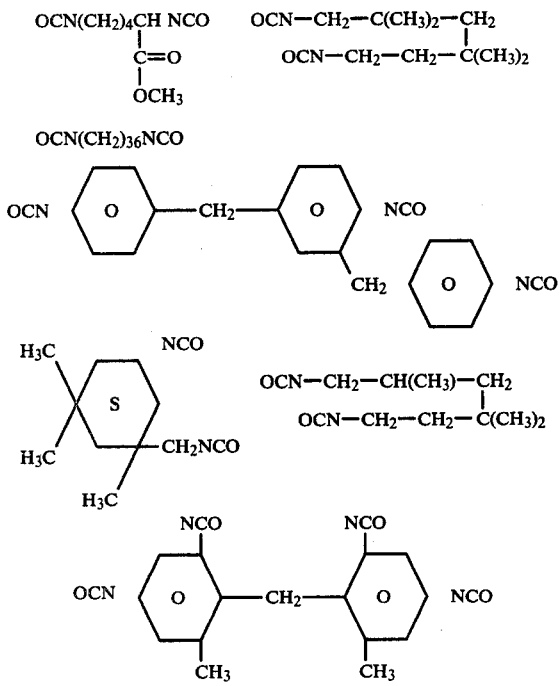

Of the above enumerated isocyanates, it is preferred that aliphatic isocyanates be employed, in particular, the isocyanates available under the mark Desmodur-N (trademark of Bayer for biuret polyisocyanates). It is to be appreciated that blocked isocyanates may also be employed. By "blocked" isocyanate means reacting the polyisocyanate with a reagent which product will break down upon the application of heat thereby having a stable isocyanate group until the desired temperature usually in excess of 50° C.

It is required that the polyisocyanate become unblocked in order to permit cross-linking of the hydroxyl containing polymerized film former during the curing step to achieve the desirable Tukon hardness. Blocking agents that may be employed are phenols, oximes such as ketoxime and aldoxime, caprolactam and triazoles and the methyl derivatives thereof such as compounds containing the structure

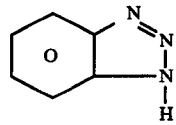

Preferred compositions useful in the present invention are catalyzed two-component polyurethane coating compositions. In order to achieve the quick curing effect, it is highly desirable that the catalyst be particularly effective in giving a coating that reaches a desirable Tukon hardness in the curing cycle of the present invention. While many catalysts for a two-component polyurethane coating composition may be employed, preferred are those that are the tin containing compositions. In particular, preferred are the compositions T-9 (trademark of M & T for stannous octoate), dibutyl tin dilaurate, Thermolite-31 (trademark of M & T for sulfur containing organic tin catalysts of the mercapto type), NIAX A1 (trademark of Union Carbide for a tertiary aliphatic amine with ether linkage). Of the above enumerated catalysts, Termolite-31 is the most preferred catalyst.

Additional useful catalysts are stannous oleoate and amine catalysts such as triethylene diamine, triethyl amine, and substituted morpholines.

To prevent premature cross-linking which causes gellation of the compositions in the present invention, the polyisocyanates are added to the resin blend just before the composition is applied.

The amount of catalysts that would be employed ranges from 0.01 to 1.0% by weight of the total resin composition. When the catalyst exceeds the upper limit, the weatherability advantages of the present composition would be decreased. Accordingly, if the amount of catalyst is less than the minimum described above, a sufficient cure at the low temperature may not be obtainable.

The coating compositions may be applied in the usual manner, i.e., rolled, dipped, brushed, sprayed and the like. The most preferred is sprayed.

Suitable examples of compositions that may be employed in the present invention are as follows:

|    |    |                          | Amount by Weight          |
|----|----|--------------------------|---------------------------|
| 1. | A. | Polyol                   |                           |
|    |    | Polycaprolactone         | 25-50% of Polyol          |
|    |    | Octylene Glycol          | Remainder of Polyol Composition |
|    | B. | Isocyanate               |                           |
|    |    | Desmodur-N               | 100%                      |
|    | C. | Catalyst                 |                           |
|    |    | Combination of Amine and T-12 | 0.025% of Total Composition |
| 2. | A. | Polyol                   |                           |
|    |    | RJ-100                   | 25-50%                    |
|    |    | Polycaprolactone         | 10-25%                    |
|    |    | Octylene Glycol          | Remainder of Polyol Composition |
|    | B. | Isocyanate               |                           |
|    |    | Desmodur-N               | 100%                      |
|    | C. | Catalyst                 |                           |
|    |    | T-12 + Amine             | 0.025% of Total Composition |

-continued

|   |   | Amount by Weight |
|---|---|---|
| 3. A. | Polyol | |
|  | RJ-100 | 10–25% |
|  | 1,3-Dihydroxy Ethyl-5,5 Dimethyl Hydantoin | 25–50% |
|  | Octylene Glycol | Remainder of Polyol Composition |
| B. | Isocyante | |
|  | Desmodur-N | 100% |
| C. | Catalyst | |
|  | Thermolite-31 | 0.025% of Total Composition |

The curing cycle in which the present multi-component compositions can be employed is from about 130° F. to about 180° F. for a period of time ranging from about 15 minutes to about 60 minutes. It should be appreciated that the longer cure times are preferably employed at the lower temperatures.

It is believed that one of the reasons why the film forming compositions of the present invention are applicable is that they contain a high proportion of primary alcohols which tend to react quickly with the isocyanate compositions than secondary alcohols, although the latter may also be present.

It has also been found desirable to add compounds which will tend to extend the pot life of the polyurethane coating compositions. When the polyol and catalyst is mixed with the polyisocyanate, these components are added so that the mixture does not gel too quickly and which permits a rapid cure upon the application of heat. The materials that may be added in amounts up to about 4% are diketo substances which it is believed tend to form metal complexes with the catalysts. Suitable materials are 2,4-pentane dione, diacetyl methane and the like.

Substrates for the present coating compositions may be metallic substrates such as steel, iron, zinc and aluminum and the like as well as wood, plastic, etc. A particularly desirable substrate is one known in the trade as SMC which is an abbreviation for sheet molding compound. SMC when molded is very firm plastic material which has as its components fiberglass reinforced thermo-set polyester.

The polyester may be prepared by reacting phthalic anhydride (2 parts), maleic anhydride (1 part) and dipropyleneglycol (10% excess). The polyester resulting from the former reaction is diluted with styrene, vinyl toluene or diallyl phthalate on a ratio of 1–2 parts of the polyester per part of the unsaturated compound. The composition is polymerized with an appropriate catalyst such as a peroxide.

The polymerized material then has about 30% by weight of fiberglass added thereto. This composition then is molded and cured under high pressure at about 350° F. It has also been found desirable to add filler components such as asbestos, sisal, talc, calcium carbonate, barytes (Ba SO$_4$), carbon and the like.

During the molding and curing of the SMC material, gas is trapped within pockets of the formed plastic. Previously, when top coat coating compositions were applied and baked, a gassing problem occurred for the gas within the pockets was released at the high cure temperature of the prior art coating compositions. Also distorted shapes were obtained as a result of the high cure temperatures.

Now, however, due to the low cure temperatures of the coating compositions of the present case, gassing is substantially eliminated for SMC materials and pin holes in the top coat is substantially eliminated.

The following are illustrations of the invention. All parts are by weight and all degrees are °F. unless otherwise indicated.

EXAMPLE 1–11

The following coating compositions were formulated as indicated in Table I. The ratio of NCO/OH was 1.1:1.0. The polyols and catalysts were pre-blended together in various organic solvents such as methyl ethyl ketone, toluene, isobutyl isobutyrate, butyl acetate or Cellosolve acetate (trademark of Union Carbide for ethyleneglycol monoethyl ether acetate). Separately the polyisocyanate was mixed with similar organic solvents. The polyol and polyisocyanate was then blended and a film cast, 3 mils wet, by spraying onto steel panels, pretreated with Bonderite coating compositions. The baking cycle is as indicated in Table I. Tukon hardness readings were obtained on the film within 20–30 minutes after removal from the oven.

The percentage for polyols listed in Table 1 is the percentage of the polyol composition. The polyisocyanate employed is sold as L-2291 by Mobay Chemical Company and is a biuret of hexa methylene diisocyanate.

The examples demonstrate coating compositions which achieve a desirable hardness in a short period of time using limited amounts of energy. The hard film formed permits handling of the work piece without marring and scratching thereof.

The formulations in Table 1 show that a satisfactory hard film may be achieved in increasing the baking time such as in Examples 2 and 4. The films that are to be produced should be protective and preferably decorative. The film produced in Example 4 may have sufficient hardness but is not protective, i.e., has little resistance to solvents and is brittle.

The formulations in Table I are given on a pigment free basis which would produce clear films. It is to be appreciated that pigments and the like agents may be added to the coating composition to enhance its protective and decorative qualities.

The procedure for determining the Tukon hardness is described in Bulletin No. SP 965-267 Tukon Hardness Tester, published by Wilson Instrument Division, American Chain and Cable Company.

TABLE I

| Polyols | 1 | 2 | 3 | 4 | 5 | 6 | 7 | 8 | 9 | 10 | 11 |
|---|---|---|---|---|---|---|---|---|---|---|---|
| Octylene Glycol | 70 | 70 | 70 | 70 | 70 | 70 |   | 50 | 70 | 50 | 47 |
| PCP-0300 |   |   |   |   |   |   |   |   |   |   | 23.5 |
| PCP-0600 | 30 |   | 30 |   | 30 | 30 | 50 |   |   |   |   |
| DHEDMH |   | 30 |   | 30 |   |   |   |   |   |   |   |
| Polyol 50 |   |   |   |   |   |   |   | 50 |   |   |   |
| RJ-100 |   |   |   |   |   |   |   |   | 30 | 50 | 29.5 |
| Hexylene Glycol |   |   |   |   |   |   | 50 |   |   |   |   |
| Catalysts |   |   |   |   |   |   |   |   |   |   |   |

TABLE I-continued

| | | | | | | | | | | | |
|---|---|---|---|---|---|---|---|---|---|---|---|
| DB Sn DL | 0.08 | 0.08 | 0.08 | 0.08 | 0.2 | 0.2 | 0.05 | 0.05 | 0.05 | 0.01 | 0.05 |
| NNDMEA | | | | | | 0.5 | 0.5 | 0.5 | 0.5 | | 0.5 |
| % Solids (Resins) | 81 | 83 | 81 | 83 | 63.4 | 63 | 61.7 | 69.9 | 68 | 68.8 | 56.6 |
| Temperature of Bake (°F.) | 150 | 150 | 150 | 150 | 150 | 150 | 150 | 150 | 150 | 150 | 150 |
| Length of Bake (Minutes) | 30 | 30 | 45 | 45 | 30 | 30 | 30 | 30 | 30 | 30 | 30 |
| Tukon Hardness | 6 | 2 | 8.7 | 5 | 7 | 8 | 9 | 6 | 8.3 | 10 | 8.8 |

PCP-0300 is a polycaprolactone polyol supplied by Union Carbide having an average molecular weight (by weight) of 540, a melting point of 15°-20° C. and a hydroxyl number of 310 and an equivalent weight of 180.
PCP-0600 is a polycaprolactone polyol supplied by Union Carbide having an average molecular weight (by weight) of approximately 2,000 to 3,000 and equivalent weight (based on hydroxyl content) of 170.
Polyol 50 is a polycaprolactone polyol supplied by Union Carbide having an average molecular weight (by weight) of approximately 2,000 to 3,000 and an equivalent weight (based on hydroxyl content) of 550.
DHEDMH is 1,3-dihydroxy ethyl -5,5-dimethyl hydantoin.
RJ-100 is the trademark of Monsanto Company for styrene-allyl alcohol copolymer having MW of 1700-2400.
DB Sn DL is dibutyl tin dilaurate. NNDMEA is N,N - dimethyl ethanolamine.

What is claimed is:

1. A polymerizable protective heat curable thermosetting coating composition comprising:
   A. a polyol composition consisting essentially of (1) a polymerized low molecular weight polyol selected from the group consisting of (a) polycaprolactone in an amount of about 10% to about 50% by weight (PBW) of the polyol portion; (b) a copolymer of a compound of the formula $CH_2=C(R)-R^1$ and allyl alcohol in an amount of 10 to 50 PBW of the polyol portion; and (c) mixtures thereof; and (2) a saturated aliphatic polyol from 4 to 12 carbon atoms or a saturated cycloaliphatic polyol of from 5 to 8 carbon atoms per ring; wherein R is methyl, ethyl or hydrogen; $R^1$ is a group having 6 to 12 carbon atoms containing an aromatic carbocyclic ring and said aromatic ring is directly bonded to the moiety $CH_5=C(R)-$; wherein the polymerized low molecular weight polyol of (A) has at least three functional groups per molecule;
   B. a polyisocyanate; wherein the ratio of NCO/OH of A and B ranges from about 0.9 to 1.2; the coating composition having a range of solids content from about 40 to about 100% by weight of A and B; and
   C. a compatible polyurethane catalyst capable of catalyzing the cross-linking reaction between the hydroxyl group of a polyol and the isocyanate group of the polyisocyanate;
   wherein the coating composition is capable of heat curing to a cross-linked coating at a temperature-time range of from about 130° to about 180° F. for a period of time ranging from about 15 minutes to about 60 minutes to achieve a Tukon hardness of at least 3 within 24 hours.

2. The composition of claim 1 wherein the polymerized polyol is a copolymer of styrene and allyl alcohol.

3. The composition of claim 1 wherein the polymerized low molecular weight polyol of A has at least three functional groups per molecule and the polyisocyanate has at least three functional groups.

4. The composition of claim 1 in a liquid sprayable form.

5. The composition of claim 4 wherein the polyol component is present in an amount as follows:
   polymerized polyol: 25-50% by weight; saturated aliphatic polyol: 75-50% by weight.

6. The composition of claim 5 wherein the polyol composition is further comprised of polyhydric hydantoin containing material in an amount up to 50% by weight.

7. The composition of claim 6 wherein the polyol composition is further comprised of cellulose acetate butyrate present in an amount from about 1 to about 60% of the polyol composition.

8. The composition of claim 4 wherein the catalyst that is employed is an organic tin catalyst.

9. The composition of claim 4 wherein the polyol composition is present in the following amounts by weight:
   Copolymer: about 25 to about 50%
   Polycaprolactone: about 10 to about 25%
   Aliphatic Polyol: remainder of polyol.

10. The composition of claim 4 wherein the polyol composition is present in the following amounts by weight:
    Copolymer: about 25 to about 50%
    Polycaprolactone: about 25 to about 50%
    Aliphatic Polyol: remainder of polyol.

11. The composition of claim 4 wherein the polyisocyanate is an aliphatic polyisocyanate.

12. The composition of claim 1 wherein the ratio NCO/OH is 1.1:1.0.

13. The composition of claim 1 wherein the number of moles of hydroxyl group per mole of copolymer is about 8.

14. The composition of claim 1 wherein the solids content is about 80% by weight of A and B.

* * * * *

UNITED STATES PATENT OFFICE
CERTIFICATE OF CORRECTION

Patent No. 4,203,875      Dated May 20, 1980

Inventor(s) JAMES W. GARNER and ROBERT G. KELSO

It is certified that error appears in the above-identified patent and that said Letters Patent are hereby corrected as shown below:

In Column 9, Line 36, delete "$CH_5=C(R)-$" and insert --- $CH_2=C(R)-$ ---.

Signed and Sealed this

Twenty-eighth Day of October 1980

[SEAL]

Attest:

SIDNEY A. DIAMOND

Attesting Officer      Commissioner of Patents and Trademarks